United States Patent
Pontisakos et al.

(10) Patent No.: US 11,148,663 B2
(45) Date of Patent: Oct. 19, 2021

(54) ENHANCED COLLISION MITIGATION

(71) Applicant: Ford Global Technologies, LLC, Dearborn, MI (US)

(72) Inventors: Christopher Pontisakos, Allen Park, MI (US); Yuhao Liu, Canton, MI (US); Steven J. Szwabowski, Northville, MI (US); Alex Maurice Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 16/590,700

(22) Filed: Oct. 2, 2019

(65) Prior Publication Data
US 2021/0101588 A1    Apr. 8, 2021

(51) Int. Cl.
| B60W 30/09 | (2012.01) |
| B60W 30/18 | (2012.01) |
| G06K 9/00 | (2006.01) |
| B60W 30/095 | (2012.01) |

(52) U.S. Cl.
CPC ........ B60W 30/09 (2013.01); B60W 30/0956 (2013.01); B60W 30/18154 (2013.01); G06K 9/00825 (2013.01); B60W 2520/14 (2013.01); B60W 2554/80 (2020.02)

(58) Field of Classification Search
CPC ............. B60W 30/09; B60W 30/0956; B60W 30/18154; B60W 2520/14; B60W 2554/80; G06K 9/00805; G06K 9/00825
See application file for complete search history.

(56) References Cited

U.S. PATENT DOCUMENTS

| 5,249,157 | A | 9/1993 | Taylor |
| 5,983,161 | A | 11/1999 | Lemelson et al. |
| 7,403,659 | B2 | 7/2008 | Das et al. |
| 7,480,570 | B2 | 1/2009 | Yopp et al. |
| 8,269,652 | B2 | 9/2012 | Seder et al. |
| 9,751,506 | B2 * | 9/2017 | Mudalige ............... G08G 1/166 |
| 2005/0084156 | A1 | 4/2005 | Das et al. |
| 2005/0232463 | A1 | 10/2005 | Hirvonen et al. |
| 2015/0220794 | A1 * | 8/2015 | Baba ...................... G06T 7/254 |
| | | | 382/103 |
| 2016/0362104 | A1 * | 12/2016 | Miller .................... B60W 30/08 |
| 2016/0368492 | A1 * | 12/2016 | Al-Stouhi ............... G08G 1/162 |
| 2018/0099665 | A1 * | 4/2018 | You ........................ G01S 13/931 |
| 2018/0208186 | A1 * | 7/2018 | Liu ........................ B60W 30/09 |
| 2019/0084558 | A1 * | 3/2019 | Kaminade ............. B60W 30/09 |

(Continued)

FOREIGN PATENT DOCUMENTS

| CA | 2049578 C | 6/2000 |
| CN | 102542843 A | 7/2012 |

*Primary Examiner* — Anshul Sood
(74) *Attorney, Agent, or Firm* — Frank A. MacKenzie; Bejin Bieneman PLC

(57) ABSTRACT

A computer includes a processor and a memory, the memory storing instructions executable by the processor to assign each of a plurality of targets to a classification based on respective motions of the targets at an initiation of a turn by a host vehicle, determine a distance threshold for each target associated with the classification, and perform a threat assessment on each of the plurality of targets having a respective distance from the host vehicle that is below a distance threshold and a respective time to collision below a time threshold.

19 Claims, 3 Drawing Sheets

(56) References Cited

U.S. PATENT DOCUMENTS

| | | | | |
|---|---|---|---|---|
| 2019/0317219 A1* | 10/2019 | Smith | .................... | G01S 17/58 |
| 2020/0001879 A1* | 1/2020 | Pietzsch | ................ | B60W 30/18 |
| 2020/0377092 A1* | 12/2020 | Torres | .................. | B60W 60/00 |
| 2020/0398833 A1* | 12/2020 | Hudecek | ................ | G08G 1/166 |

* cited by examiner

ENHANCED COLLISION MITIGATION

BACKGROUND

Vehicle collisions can occur at intersections. Collision avoidance systems use sensors to detect a target that can collide with a host vehicle in the intersection. The systems can detect a target object position and speed to determine a probability of a collision with the host vehicle. Collision mitigation may be computationally and/or architecturally difficult and expensive to implement, e.g. assessing a target may require data from a plurality of sensors.

DETAILED DESCRIPTION

Figure 1:
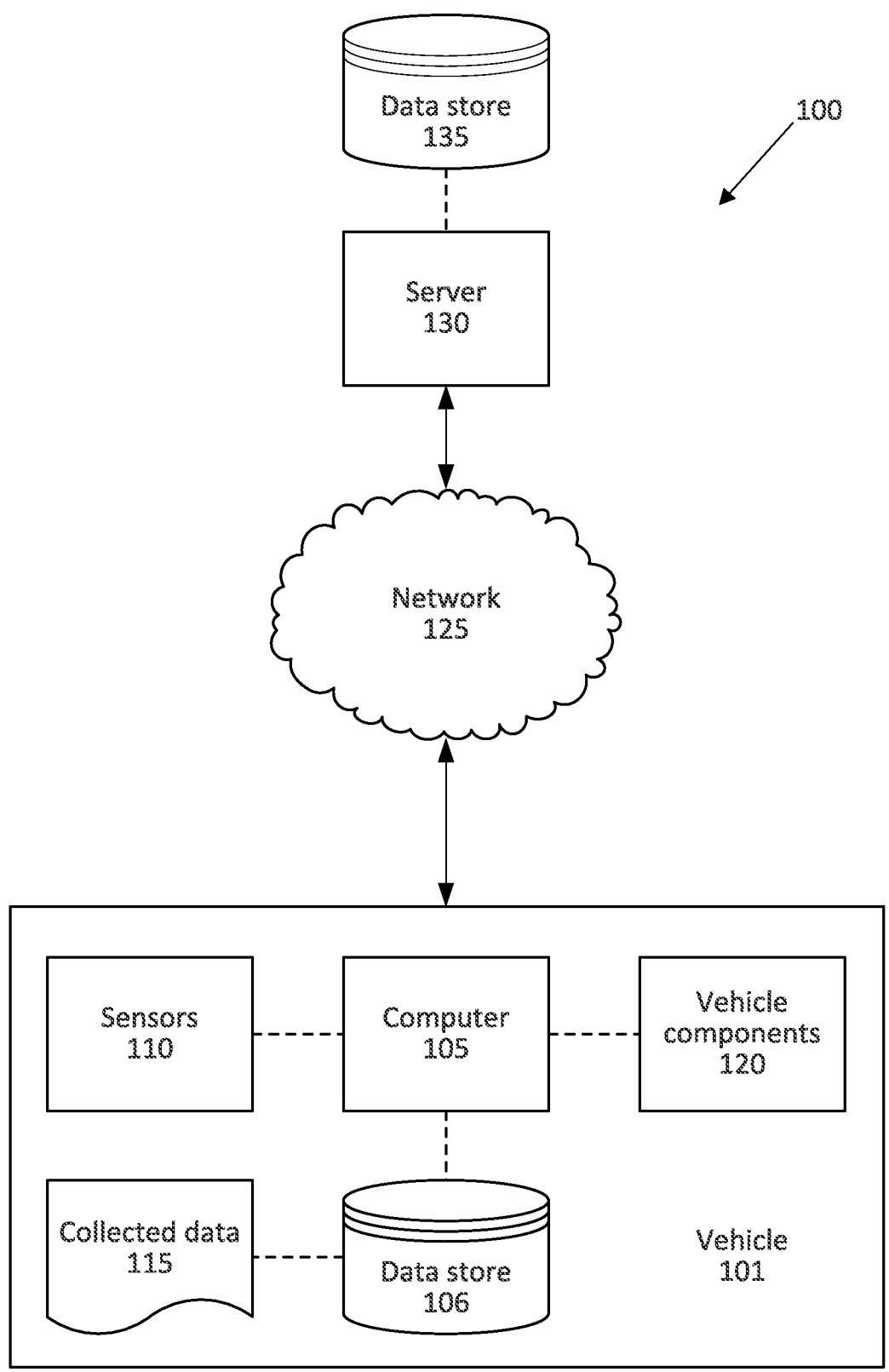
FIG. 1 is a block diagram of an example system for collision mitigation.

A computer includes a processor and a memory, the memory storing instructions executable by the processor to assign each of a plurality of targets to a classification based on respective motions of the targets at an initiation of a turn by a host vehicle, determine a distance threshold for each target associated with the classification, and perform a threat assessment on each of the plurality of targets having a respective distance from the host vehicle that is below the distance threshold associated with the respective classification.

The classification can be one of stationary, crossing left, crossing right, oncoming, and same direction.

The instructions can further include instructions to perform the threat assessment on each of the plurality of targets having a respective lateral distance that is below a lateral distance threshold and a respective longitudinal distance that is below a longitudinal distance threshold, the lateral distance threshold and the longitudinal distance thresholds being determined based on the classification.

The instructions can further include instructions to classify each of the plurality of targets based on a yaw rate of the host vehicle at the initiation of the turn by the host vehicle.

The instructions can further include instructions to assign a classification of same direction when a heading angle of one of the targets is within a first threshold of zero degrees, to assign a classification of oncoming when the heading angle of one of the targets is within a second threshold of 180 degrees, to assign a classification of crossing left when the heading angle of one of the targets is within a third threshold of 90 degrees, and to assign a classification of crossing right when the heading angle of one of the targets is within a fourth threshold of 270 degrees.

The instructions can further include instructions to, upon identifying a number of the plurality of targets on which to perform the threat assessment that is below a predetermined number, adjust the distance threshold to identify additional targets.

The instructions can further include instructions to, upon identifying a number of the plurality of targets is above the predetermined number, to select the predetermined number of targets having the lowest times to collision.

The instructions can further include instructions to remove a target from consideration for threat assessment when one or more sensors of the host vehicle fail to collect data about the target.

The instructions can further include instructions to determine a respective heading angle of each of the plurality of targets based on a respective lateral velocity and a respective longitudinal velocity of the target and to classify each of the plurality of targets based on the respective heading angle.

The instructions can further include instructions to determine the respective distance between each of the plurality of targets and a center point of a front bumper of the host vehicle.

The instructions can further include instructions to identify the initiation of the turn when a yaw rate of the host vehicle exceeds a yaw rate threshold.

The instructions can further include instructions to assign a new classification for one of the targets when a speed of the target exceeds a first threshold or the speed of the target is below a second threshold.

The instructions can further include instructions to assign a new classification for one of the targets based on a current heading angle of the target.

The instructions can further include instructions to actuate one or more components of the host vehicle based on the threat assessment.

The threat assessment can be a brake threat number, and the instructions can further include to actuate a brake to slow the host vehicle according to the brake threat number.

The threat assessment can be an acceleration threat number, and the instructions can further include instructions to actuate a propulsion to accelerate the host vehicle according to the acceleration threat number.

The threat assessment can be a steering threat number, and the instructions can further include instructions to actuate a steering motor to steer the host vehicle according to the steering threat number.

A method includes assigning each of a plurality of targets to a classification based on motion of the targets at an initiation of a turn by a host vehicle, determining a distance threshold for each target associated with the classification, and performing a threat assessment on each of the plurality of targets having a respective distance from the host vehicle that is below the distance threshold associated with the respective classification.

The method can further include performing the threat assessment on each of the plurality of targets having a respective lateral distance that is below a lateral distance threshold and a respective longitudinal distance that is below a longitudinal distance threshold, the lateral distance threshold and the longitudinal distance thresholds being determined based on the classification.

The method can further include classifying each of the plurality of targets based on a yaw rate of the host vehicle at the initiation of the turn by the host vehicle.

The method can further include assigning a classification of same direction when a heading angle of one of the targets is within a first threshold of zero degrees, to assign a classification of oncoming when the heading angle of one of the targets is within a second threshold of 180 degrees, to assign a classification of crossing left when the heading angle of one of the targets is within a third threshold of 90 degrees, and to assign a classification of crossing right when the heading angle of one of the targets is within a fourth threshold of 270 degrees.

The method can further include, upon identifying a number of the plurality of targets on which to perform the threat assessment that is below a predetermined number, adjusting the distance threshold to identify additional targets.

The method can further include, upon identifying a number of the plurality of targets is above the predetermined number, selecting the predetermined number of targets having the lowest times to collision.

The method can further include removing a target from consideration for threat assessment when one or more sensors of the host vehicle fail to collect data about the target.

The method can further include determining a respective heading angle of each of the plurality of targets based on a respective lateral velocity and a respective longitudinal velocity of the target and classifying each of the plurality of targets based on the respective heading angle.

The method can further include determining the respective distance between each of the plurality of targets and a center point of a front bumper of the host vehicle.

The method can further include identifying the initiation of the turn when a yaw rate of the host vehicle exceeds a yaw rate threshold.

The method can further include assigning a new classification for one of the targets when a speed of the target exceeds a first threshold or the speed of the target is below a second threshold.

The method can further include assigning a new classification for one of the targets based on a current heading angle of the target.

The method can further include actuating one or more components of the host vehicle based on the threat assessment.

The threat assessment can be a brake threat number, and the method can further include actuating a brake to slow the host vehicle according to the brake threat number.

The threat assessment can be an acceleration threat number, and the method can further include actuating a propulsion to accelerate the host vehicle according to the acceleration threat number.

The threat assessment can be a steering threat number, and method can further include actuating a steering motor to steer the host vehicle according to the steering threat number.

A system includes a host vehicle including a steering component, means for actuating the steering component to perform a turn, means for assigning each of a plurality of targets to a classification based on motion of the targets at an initiation of the turn, means for determining a distance threshold for each target associated with the classification, and means for performing a threat assessment on each of the plurality of targets having a respective distance from the host vehicle that is below the distance threshold associated with the respective classification.

The system can further include means for classifying each of the plurality of targets based on a yaw rate of the host vehicle at the initiation of the turn by the host vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Classifying targets according to respective directions of movement allows a computer in a host vehicle to select targets most likely to collide with the host vehicle for threat assessment. Each classification can be associated with a respective distance threshold to account for movement of the target toward or away from the host vehicle. That is, each distance threshold can be tailored to the specific type of movement of each target to specify threat assessments for targets most likely to collide with the host vehicle. The computer can prioritize the targets based on the distance between the targets and the host vehicle and a predicted time to collision between the targets and the host vehicle. By considering both the time to collision and the distance, the computer can identify the targets to which to perform threat assessment.

FIG. 1 illustrates an example system 100 for collision mitigation. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
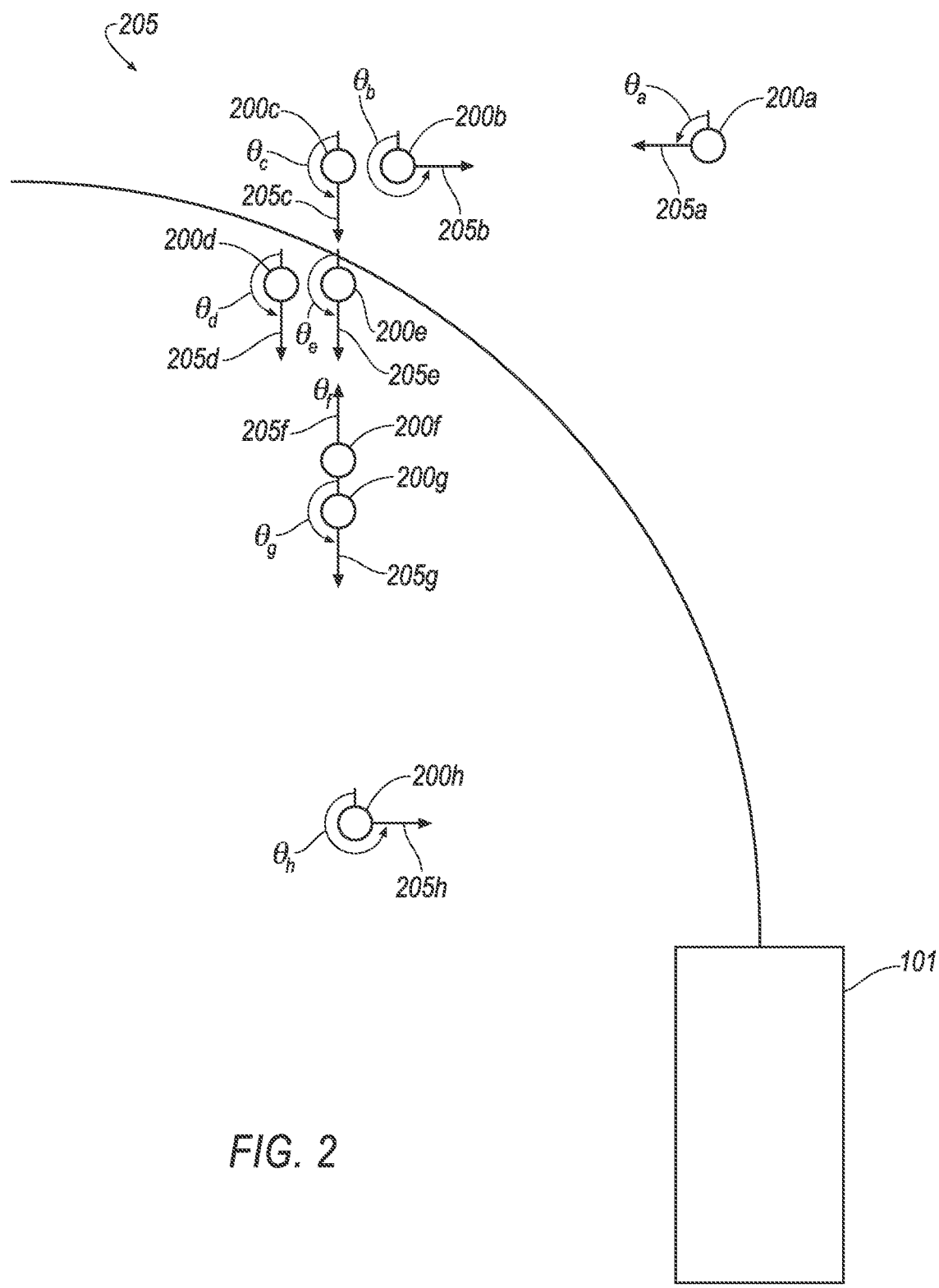
FIG. 2 is a plan view of an example intersection.

FIG. 2 is a plan view of a host vehicle 101 and a plurality of targets 200 at an intersection 205. As used herein, an "intersection" is defined as a location where two or more vehicles' current or potential future trajectories cross. Thus, an intersection 205 could be at any location on a surface where a vehicle and a target could collide, e.g. a road, a driveway, a parking lot, an entrance to a public road, driving paths, etc. Accordingly, an intersection 205 is determined by identifying an area where the vehicle and the target may meet, i.e., collide. The size of the area defining the intersection 205 can be specified to encompass an area in which collisions may occur, e.g., based on a number of roadway lanes, a roadway lane size, a vehicle size, location data of prior collisions, etc. For example, the intersection 205 can encompass 400 $m^2$ to account for the meeting of two adjacent roadway lanes and two transverse roadway lanes. Such determination uses potential future trajectories of a host vehicle 101 as well as nearby other vehicles and/or other objects. In the example of FIG. 2, nine targets 200a, 200b, 200c, 200d, 200e, 200f, 200g, and 200h (collectively, targets 200) are shown in the intersection 205. The intersection 205 can include a different number of targets 200, e.g., eight, ten, etc. The targets 200 move through the intersection 205, e.g., through a crosswalk from one sidewalk to another sidewalk. The host vehicle 101 is represented as a rectangle having a side extending along a front bumper of the host vehicle 101, a second side extending along a right side of the host vehicle 101, a third side extending along a rear bumper of the host vehicle 101, and a fourth side extending along a left side of the host vehicle 101. Representing the host vehicle 101 as a rectangle allows the computer 105 to use existing distance and time to collision algorithms, as described below.

The computer 105 can identify the targets 200 that the host vehicle 101 should avoid at the intersection 205. To identify the targets 200, the computer 105 actuates a plurality of sensors 110 to collect data 115 about the targets 200. The computer 105 can process the data 115 to reduce false positive identification of objects that are not targets 200 that the host vehicle 101 should avoid. That is, as described below, when the data 115 are unreliable, the computer 105 can ignore the data 115 as falsely detecting a target 200, thus increasing computational efficiency by reducing unneeded processing.

The computer 105 can identify objects as targets 200 when more than one sensor 110 collects data 115 about the target 200. An "object" is a physical thing about which the sensor 110 collects data 115, i.e., when the sensor 110 receives data 115 (e.g., image data 115, radar data 115, lidar data 115, etc.), the data 115 represent an "object." Each sensor 110 can collect data 115 about objects around the host vehicle 101. To improve the likelihood that the data 115 represent targets 200 and not false positives from, e.g., errors in the data 115, the computer 105 can determine that objects detected by more than one sensor 110 are targets 200. For example, the computer 105 can identify objects as targets 200 when both a radar 110 and a camera 110 collect data 115 detecting the object.

The computer 105 can identify objects as targets 200 when an elapsed time that the sensors 110 have collected data 115 about the targets 200 exceeds a collection time threshold. If the sensor 110 detects an object for an elapsed time below the collection time threshold, the detected object can be an error in the data 115 or the object may have moved away from the detection range of the sensor 110. The collection time threshold can be determined based on empirical testing of sensors 110 collecting data 115 about targets 200. Such testing can include collecting data 115 for different periods of time (e.g., 5 second intervals up to 60 seconds) and determining amounts of elapsed time that correspond to correctly identifying reference objects. For example, if the testing indicates that at an elapsed time of 5 seconds, the objects are false positives, and at an elapsed time of 15 seconds, the reference objects are all positively identified, the collection time threshold can be 15 seconds. The computer 105 can determine that the data 115 for a target 200 are "unreliable" when only one sensor 110 collects data 115 about the target 200 or the elapsed time that the sensors 110 collect data 115 about the target 200 is below the collection time threshold. That is, the computer 105 should collect enough data 115 about the target 200 from more than one sensor 110 and for a time exceeding the collection time threshold to reliably detect the target 200, reducing false positive identification of targets 200.

The computer 105 can identify the targets 200 as vulnerable road users (VRU). In this context, a "vulnerable road user" is a user of a roadway that is not a conventional vehicle and with which a collision could result in more damage to the VRU than to the host vehicle 101. That is, VRU's are typically much smaller and/or of much less mass (e.g., a tenth or less size and/or mass) than the host vehicle 101. Example VRU's include, e.g., pedestrians, cyclists, moped users, wheelchair users, motorized scooter users, etc. The computer 105 can perform threat assessments for VRU's that are different than threat assessments for other vehicles 101. For example, because a VRU typically does not move faster than vehicles 101, the threat assessment can include speed predictions associated with the VRU.

The computer 105 can identify each target 200 at an initiation of a turn. In this context, the "initiation" of a turn is a time at which a yaw rate ω of the host vehicle 101 exceeds a yaw rate threshold. The yaw rate threshold can be the minimum yaw rate ω required to turn the host vehicle 101 from a current roadway lane to a roadway lane substantially perpendicular to the current roadway lane. That is, the yaw rate threshold can be determined as a yaw rate to turn the host vehicle 101 into a transverse roadway lane. The yaw rate threshold can be determined based on, e.g., empirical testing of vehicles 101 turning into roadway lanes, simulation testing of virtual vehicles 101, etc.

The computer 105 can identify a heading angle θ for each target 200. The "heading angle" θ is an angle defined between a trajectory 205 of the target 200 and an axis parallel to a longitudinal axis of the host vehicle 101 at the initiation of the turn. In the example of FIG. 2, each trajectory 205 and heading angle θ is marked according to the letter of its corresponding target 200, e.g., the target 200a has a trajectory 205a and a heading angle $\theta_a$. The computer 105 can determine the heading angle θ based on data 115 collected by the sensors 110 about the targets 200. For example, the computer 105 can apply a conventional image-processing algorithm (e.g., Canny edge detection) to image data 115 to determine the trajectory 205 of the target 200 and the heading angle θ.

The computer 105 can assign a classification to each target 200 based on a respective heading angle θ. The classification can be one of stationary, crossing left, crossing right, same direction, and oncoming. The classification describes movement of the target 200 in the intersection 205. Based on the classification, the computer 105 can selected a predetermined number of targets 200 on which to perform threat assessment.

The target 200 can have a classification of "stationary." In this context, a "stationary" target is a target 200 that has a speed below a speed threshold. That is, a stationary target 200 is either not moving or moving too slowly to react before the host vehicle 101 completes the turn. The speed threshold can be, e.g., 1 m/s. The speed threshold can change based on a current classification of the target 200 to account for small variations of the target 200 speed about the current speed threshold, e.g., 0.1 m/s. For example, if the target 200 has no current classification, the computer 105 can assign the classification of "stationary" when the speed of the target 200 is below a first threshold, e.g., 0.5 m/s. If the target 200 is currently assigned the classification of "stationary," the computer 105 can assign one of the other classifications describing movement of the target 200 when the speed of the target 200 exceeds a second threshold, e.g., 1 m/s. If the target 200 is currently assigned one of the classifications describing movement, as described below, the computer 105 can assign the target 200 to the "stationary" classification when the speed of the target is below the first threshold (0.5 m/s in this example). Thus, rather than rapidly assigning different classifications when the speed of the target 200 varies slightly about the speed threshold, the computer 105 can adjust the speed threshold to reduce assignments of classifications from small variations in target 200 speed.

The target 200 can have a classification of "crossing left." In this context, a "crossing left" target is a target 200 that is moving to the left relative to the host vehicle 101 at a speed greater than the speed threshold at the initiation of the turn. That is, the heading angle θ of the target 200 is within a threshold of a heading angle θ value of 90 degrees. The threshold can be determined based on empirical testing of vehicles 101 and targets 200. The threshold can be, e.g., 45 degrees. In the example of FIG. 2, the target 200a is classified as crossing left.

The target 200 can have a classification of "crossing right." In this context, a "crossing right" target is a target 200 that is moving to the right relative to the host vehicle 101 at a speed greater than the speed threshold at the initiation of the turn. That is, the heading angle θ of the target 200 is within a threshold of a heading angle θ value of 270 degrees. The threshold can be determined based on empirical testing of vehicles 101 and targets 200. The threshold can be, e.g., 45 degrees. The threshold for the crossing right classification can be the same as the threshold for the crossing left classification to provide symmetry in determining whether the target 200 is crossing to the left or to the right. In the example of FIG. 2, the targets 200b, 200h are classified as crossing right.

The target 200 can have a classification of "same direction." In this context, a "same direction" target is a target 200 that is moving substantially in a same direction as the host vehicle 101 at a speed greater than the speed threshold at the initiation of the turn. That is, the heading angle θ of the target 200 is within a threshold of a heading angle θ value of 0 degrees. The threshold can be determined based on empirical testing of vehicles 101 and targets 200. The threshold can be, e.g., 45 degrees. In the example of FIG. 2, the target 200f is classified as same direction.

The target 200 can have a classification of "oncoming." In this context, an "oncoming" target is a target 200 that is moving toward the host vehicle 101 at a speed greater than the speed threshold at the initiation of the turn. That is, the heading angle θ of the target 200 is within a threshold of a heading angle θ value of 180 degrees. The threshold can be, e.g., 45 degrees. The threshold for the same direction classification can be the same as the threshold for the oncoming classification to provide symmetry in determining whether the target 200 is oncoming or in the same direction as the host vehicle 101. In the example of FIG. 2, the targets 200c, 200d, 200e, and 200g are classified as oncoming.

The sum of the threshold for the same direction classification and the threshold for either the crossing left classification or the crossing right classification can equal 90 degrees. The sum of the threshold for the oncoming classification and the threshold for either the crossing left classification or the crossing right classification can equal 90 degrees. That is, to account for the symmetries in the thresholds for the crossing left and crossing right classifications and the thresholds for the oncoming and same direction thresholds in a 360 degree circle, the respective sum of two adjacent thresholds is 90 degrees. Thus, because each pair of adjacent thresholds equals 90 degrees, and there are four pairs of adjacent thresholds, each heading angle 0≤θ≤360 is assigned to exactly one classification.

Alternatively, the computer 105 can determine the heading angle θ for each target 200 based on a lateral velocity $V_{lat}$ of the target 200 and a longitudinal velocity $V_{long}$ of the target 200. At the initiation of the turn, the computer 105 can identify initial lateral and longitudinal velocities $V_{lat}$, $V_{long,i}$ for each target 200. While in the turn, the computer 105 can identify a heading angle φ of the host vehicle 101 as the change in the heading angle φ from the initiation of the turn to the current position of the host vehicle 101. That is, the computer 105 can determine the heading angle φ based on a yaw rate ω of the host vehicle 101 at the initiation of the turn, rotating components of a current velocity of the target 200 to a reference frame at the initiation of the turn. The computer 105 can determine respective lateral and longitudinal velocities $V_{lat}$, $V_{long}$ and a heading angle θ for each target 200 based on the heading angle φ of the host vehicle 101:

$$V_{lat} = V_{lat,i}\cos(-\varphi) - V_{long,i}\sin(-\varphi) \qquad (1)$$

$$V_{long} = V_{lat,i}\sin(-\varphi) + V_{long,i}\cos(-\varphi) \qquad (2)$$

$$\theta = \arctan\left(\frac{|V_{lat}|}{|V_{long}|}\right) \qquad (3)$$

Based on the heading angle θ and the component velocities $V_{lat}$, $V_{long}$, the computer 105 can assign classifications to each target 200, as shown in Table 1:

TABLE 1

| Classification | Velocity | Heading Angle |
| --- | --- | --- |
| Same Direction | $V_{long} \geq 0$ | $\theta \leq SD_{thresh}$ |
| Oncoming | $V_{long} < 0$ | $\theta \leq OC_{thresh}$ |
| Crossing Right | $V_{lat} \leq 0$ | $\theta > CR_{thresh}$ |
| Crossing Left | $V_{lat} > 0$ | $\theta > CL_{thresh}$ | where $SD_{thresh}$ is the threshold for the same direction classification, as described above, $OC_{thresh}$ is the threshold for the oncoming classification, $CR_{thresh}$ is the threshold for the crossing right classification, and $CL_{thresh}$ is the threshold for the crossing left classification. The computer 105 can determine the heading angle θ for the targets 200 with this technique when data 115 about the heading angle θ of each target 200 is unreliable, as described above, and/or not collected by the sensors 110. For example, the computer 105 can determine the heading angle θ with this technique when the data 115 fall below a conventional confidence threshold, the "confidence threshold" being an amount of data 115 that are not noise, obstructions, etc.

While collecting data 115 about the targets 200, the computer 105 can assign a new classification to one of the targets 200 if motion of the target 200 changes. For example, if the computer 105 identified the target 200 as an oncoming target 200, and new data 115 indicate that the speed of the target 200 is below a speed threshold (e.g., 1 m/s), the computer 105 can determine that the target 200 has stopped and can assign the target 200 a new classification of "stationary." In another example, if new data 115 for a target 200 indicate that the heading angle θ of the target 200 correspond to a different classification than earlier data 115, the computer 105 can determine that the target 200 has changed direction and can assign the target 200 with the new classification associated with the current heading angle θ. In another example, when the host vehicle 101 exits the turn, the computer 105 can assign new classifications for any remaining identified targets 200. The host vehicle 101 "exits the turn" when the computer 105 identifies that the yaw rate ω is below the yaw rate threshold, as described above. Alternatively, the host vehicle 101 exits the turn when the computer 105 identifies that the heading angle θ of the host vehicle 101 has changed by 90 degrees, i.e., the host vehicle 101 has turned perpendicular relative to the initiation of the turn.

The computer 105 can predict respective distances between the host vehicle 101 and each target 200. Specifically, the computer 105 can predict distances between a specified point on the host vehicle 101 and each target 200. The specified point can be, e.g., a center point of a front bumper, a corner point of the front bumper, etc. The computer 105 can, based on a current trajectory 205 of each target 200 and a conventional kinematic model such as CRTV, predict a path that each target 200 will follow during the turn. That is, the computer 105 can predict respective positions of the host vehicle 101 and each target 200 and can determine lateral and longitudinal distances between the positions as the distance between the host vehicle 101 and the target 200 at the initiation of the turn:

$$\text{Long}_h(T) = \text{Long}_{h,0} + \frac{V_{h,0}}{\omega}\sin(\omega T) \qquad (4)$$

$$\text{Lat}_h(T) = \text{Lat}_{h,0} - \frac{V_{h,0}}{\omega}(\cos(\omega T) - 1) \qquad (5)$$

where $\text{Long}_h$ is a longitudinal position of the host vehicle 101, $\text{Lat}_h$ is a lateral position of the host vehicle 101, $\text{Long}_{h,0}$ is the longitudinal position of the host vehicle 101 at the initiation of the turn, $\text{Lat}_{h,0}$ is the lateral position of the host vehicle 101 at the initiation of the turn, $V_{h,0}$ is the velocity of the host vehicle 101 at the initiation of the turn, ω is the yaw rate of the host vehicle 101, and T is an elapsed time to predict from a current time. In this example, the computer 105 determines the distances and velocities of the host vehicle 101 with respect to a center point of a front bumper.

The computer 105 can determine the relative longitudinal and lateral positions of the targets 200 based on the respective velocities of the targets 200:

$$\text{Long}_{tg}(T) = \text{Long}_{tg,0} + V_{tg,long} \qquad (6)$$

$$\text{Lat}_{tg}(T) = \text{Lat}_{tg,0} + V_{tg,lat} \qquad (7)$$

where $\text{Long}_{tg}$ is the longitudinal position of the target 200, $\text{Lat}_{tg}$ is the lateral position of the target 200, $\text{Long}_{tg,0}$ is the longitudinal position of the target 200 at the initiation of the turn, $\text{Lat}_{tg,0}$ is the lateral position of the target 200 at the initiation of the turn, $V_{tg,long}$ is the longitudinal velocity of the target 200, and $V_{tg,lat}$ is the lateral velocity of the target 200.

The computer 105 can determine relative motion between the host vehicle 101 and the target 200 based on the lateral and longitudinal positions of the host vehicle 101 and the target 200:

$$\text{Long}_{rel} = (\text{Long}_{tg,0} - \text{Long}_{h,0}) + \left(V_{tg,long} - \frac{V_{h,0}}{\omega}\sin(\omega T)\right) \qquad (8)$$

$$\text{Lat}_{rel} = (\text{Lat}_{tg,0} - \text{Lat}_{h,0}) + \left(V_{tg,lat} + \frac{V_{H,0}}{\omega}(\cos(\omega T) - 1)\right) \qquad (9)$$

where $\text{Long}_{rel}$ is the relative longitudinal distance between the host vehicle 101 and the target 200 and $\text{Lat}_{rel}$ is the relative lateral distance between the host vehicle 101 and the target 200.

The relative lateral and longitudinal distances described above are described with respect to the center point of the front bumper of the host vehicle 101. Alternatively, the computer 105 can adjust the prediction based on a distance between a rear axle of the host vehicle 101 and the front bumper of the host vehicle 101. That is, the rear axle provides the propulsion to move the host vehicle 101, and thus the measured velocity of the host vehicle 101. The lateral distance between the front bumper and the rear axle causes the rotational components of the velocity of the host vehicle 101 to differ at the front bumper and the rear axle. Thus, the velocity of the host vehicle 101 should be adjusted by rotating the relative distances from the coordinate system at the initiation of the turn to a current coordinate system that is rotated relative to the initial coordinate system. The relative position between the host vehicle 101 and the target 200 differs according to an offset length $L_{offset}$:

$$L_{offset} = \left| \frac{V_{h,lat}}{\omega} \right| \tag{10}$$

where $V_{h,lat}$ is the lateral velocity of the host vehicle 101 at the center point of the front bumper and is determined as the lateral velocity of the host vehicle 101.

The computer 105 can predict relative longitudinal and lateral distances between the host vehicle 101 and the target 200 in the initial coordinate system based on the offset length:

$$\text{Long}_{rel,unrot} = (\text{Long}_{tg,0} - \text{Long}_{h,0}) + \left(V_{tg,long} - \frac{V_{h,0}}{\omega}\sin(\omega T)\right) + L_{offset} \tag{11}$$

$$\text{Lat}_{rel,unrot} = (\text{Lat}_{tg,0} - \text{Lat}_{h,0}) + \left(V_{tg,lat} + \frac{V_{h,0}}{\omega}(\cos(\omega T) - 1)\right) \tag{12}$$

where $\text{Long}_{rel,unrot}$ is the relative longitudinal distance in the initial (i.e., unrotated) coordinate system and $\text{Lat}_{rel,unrot}$ is the relative lateral distance in the initial coordinate system. The computer 105 can predict the relative longitudinal distance and the relative lateral distance in the rotated coordinate system at the time T:

$$\text{Long}_{rel,rot} = \text{Lat}_{rel,unrot}*\sin(\omega T) + \text{Long}_{rel,unrot}*\cos(\omega T) - L_{offset} \tag{13}$$

$$\text{Lat}_{rel,rot} = \text{Lat}_{rel,unrot}*\cos(\omega T) - \text{Long}_{rel,unrot}*\sin(\omega T) \tag{14}$$

where $\text{Long}_{rel,rot}$ is the relative longitudinal distance between the host vehicle 101 and the target 200 in the rotated coordinate system and $\text{Lat}_{rel,rot}$ is the relative lateral distance between the host vehicle 101 and the target 200 in the rotated coordinate system. Upon predicting the relative longitudinal and lateral distances, the computer 105 can compare the predicted relative distance with the smallest magnitude to a distance threshold, as described below, to identify a target 200 for threat assessment.

The computer 105 can determine whether the predicted distance between the host vehicle 101 and a target 200 is within a distance threshold. That is, the computer 105 can select targets 200 for threat assessment that have respective distances within the distance threshold associated with their respective classification and times to collision within the time threshold. The distance threshold can be one of a lateral distance threshold or a longitudinal distance threshold. That is, the computer 105 can compare the lateral distance between the host vehicle 101 and each target 200, as described above, to the lateral distance threshold, and the computer 105 can compare the longitudinal distance between the host vehicle 101 and each target 200 to a longitudinal distance threshold. When both the lateral distance is within the lateral distance threshold and the longitudinal distance is within the longitudinal distance threshold, the computer 105 can identify the target 200 for threat assessment.

Each classification can have a different distance threshold that accounts for movement of the target 200 associated with the classification. For example, a target 200 with a classification of "oncoming" may be moving toward the host vehicle 101 during the turn, and a second target 200 with a classification of "crossing right" may be moving away from the host vehicle 101 during the turn. The distance threshold of the oncoming target 200 can be higher than the distance threshold of the crossing right target 200 to cause oncoming targets 200 to be prioritized over crossing right targets 200 because the oncoming targets 200 are approaching the host vehicle 101. The distance thresholds can be determined based on empirical testing and virtual simulation of a plurality of virtual targets 200 and a virtual host vehicle 101. For example, the distance thresholds can be determined based on a design of experiments simulation with a plurality of virtual targets 200 moving in several different directions relative to a virtual host vehicle 101 at a plurality of different velocities, the distance thresholds being determined as distances at which the virtual host vehicle 101 should avoid specific virtual targets 200 according to their respective classifications. Example distance thresholds are shown in the table below:

TABLE 2

| Classification | Distance Threshold (m) |
|---|---|
| Stationary | 1.0 |
| Oncoming | 2.1 |
| Same Direction | 2.1 |
| Crossing Left | 1.0 |
| Crossing Right | 1.0 |

The computer 105 can predict respective times to collision between the host vehicle 101 and each target 200. The time to collision is a predicted time for the host vehicle 101 to reach the target 200. The computer 105 can predict the time to collision as a range (i.e., a straight-line distance between the host vehicle 101 and the target 200 at the initiation of the turn) divided by a range rate (i.e., a time rate of change of the range as the host vehicle 101 moves in the turn). The computer 105 can identify targets 200 for threat assessment that have respective times to collision below a time threshold. The time threshold can be a predetermined value based on empirical testing of host vehicles 101 and targets 200. The time threshold can be, e.g., 3 seconds. That is, upon identifying a target 200 that is within the distance threshold associated with the classification of the target 200, the computer 105 can determine not to perform the threat assessment when the time to collision of the target 200 exceeds the time threshold.

The computer 105 can, upon identifying a number of the plurality of targets 200 on which to perform the threat assessment that is below a predetermined number, adjust the distance threshold until the number of identified targets 200 is above the predetermined number. That is, the computer 105 can perform threat assessment up to a maximum number of targets 200, typically based on determining a number of targets that can be timely and/or efficiently processed by computational resources available in the computer 105. In one example, the computer 105 can perform threat assessment for up to four targets 200. When the computer 105 identifies fewer than the maximum number of targets 200 to perform the threat assessment, the computer 105 has available resources to perform additional threat assessments. Thus, the computer 105 can adjust the distance threshold to identify additional targets to perform threat assessment. For example, the computer 105 can increase the distance threshold to a predetermined second threshold (e.g., from 2.1 m to 4.0 m) to capture targets 200 that were beyond the original distance threshold. Upon increasing the distance threshold to the second distance threshold, the computer 105 can perform threat assessments on targets 200 detected within the second distance threshold even if the number of identified targets 200 is below the predetermined number. Alternatively, the computer 105 can increase the threshold to successively higher thresholds until detecting a number of targets 200 exceeding the predetermined number.

Upon identifying a number of targets 200 exceeding the predetermined number, the computer 105 can identify the predetermined number of targets 200 according to respective times to collision of each target 200. As described above, the time to collision is a predicted time for the host vehicle 101 to reach the target 200. Upon determining the time to collision for each target 200, the computer 105 can identify a first target 200 as having the lowest time to collision. After identifying the first target 200, the computer 105 compares the number of selected targets to the predetermined number. If the number of identified targets 200 is below the predetermined number, the computer 105 identifies the target 200 with the next lowest time to collision. The computer 105 continues to identify target 200 with the lowest times to collision until the number of identified targets 200 is the predetermined number. For example, if the predetermined number is four, the computer 105 identifies the four targets 200 having the lowest times to collision, i.e., the target 200 with the lowest time to collision, the target 200 with the second lowest time to collision, the target 200 with the third lowest time to collision, and the target 200 with the fourth lowest time to collision. By identifying the targets 200 with the lowest times to collision, the computer 105 prioritizes the targets 200 for threat assessment most likely to collide with the host vehicle 101.

Upon selecting the targets 200, the computer 105 can perform a threat assessment for each target 200. The threat assessment can be a threat number. The computer 105 can determine the threat number TN based on the time to collision, described above. A threat number is a prediction of whether a specific target 205 will intersect or collide with the host vehicle 101. Specifically, the computer 105 may determine an acceleration threat number ATN, a brake threat number BTN, and a steering threat number STN for the host vehicle 101 and the target 205, and based on the threat numbers ATN, BTN, STN, which may be combined into a single threat number TN, to actuate components 120. In one non-limiting example, the BTN, STN, and ATN can be determined in a manner described further below and in U.S. Pat. No. 9,610,945, issued Apr. 4, 2017, which is incorporated herein by reference in its entirety. That is, the computer 105 can determine one of a deceleration to slow or stop the host vehicle 101 prior to the time to collision, a lateral acceleration to steer the host vehicle 101 away from the target 205 prior to the time to collision, or an acceleration to propel the host vehicle 101 past the target 205 prior to the time to collision.

The BTN is a measure of a needed longitudinal deceleration to allow the host vehicle 101 to stop before colliding with the target 200. The BTN can be based on a measured host vehicle 101 speed, a distance between the target 200 and the host vehicle 101, and the respective projected trajectories of the target 200 and the host vehicle 101. The computer 105 can determine a longitudinal deceleration to stop the host vehicle 101 before colliding with the target 200, e.g., 2 m/s$^2$. The computer 105 can determine a maximum deceleration of the host vehicle 101, e.g., 8 m/s$^2$. The BTN can be the ratio of the needed deceleration to the maximum deceleration, e.g., BTN=$^2$⁄$_8$=0.25. The needed deceleration can be a zero-range deceleration, i.e., a deceleration determined by a path-planning algorithm to stop the host vehicle 101 at a specified point to avoid a collision with the target 200. The computer 105 can identify the specified point as a point outside of a projected path of the target 200. If the needed deceleration to avoid a collision with the target 200 exceeds the maximum deceleration of the host vehicle 101, i.e., BTN>1, then the computer 105 can set the value of the BTN to 1, i.e., if BTN>1, BTN=1.

The STN is a measure of a needed lateral acceleration to allow the host vehicle 101 to steer away from the target 200. For example, the STN can be a measure of the lateral acceleration to steer the host vehicle 101 away from the target 200 in a direction opposite to a direction of travel of the host vehicle 101. That is, when the host vehicle 101 is in a left-hand turn, the STN is based on the lateral acceleration to steer the host vehicle 101 to the right away from the target 200. As with the BTN, the computer 105 can determine a needed lateral acceleration to avoid a collision between the host vehicle 101 and the target 200. The STN can be the ratio of the needed lateral acceleration to a maximum lateral acceleration of the host vehicle 101. If the needed lateral acceleration exceeds the maximum lateral acceleration, the computer 105 can set the STN to 1.

The ATN is a measure of a needed longitudinal acceleration to allow the host vehicle 101 to accelerate and pass the target 200. As described above for the BTN and the STN, the computer 105 can determine a needed acceleration to allow the host vehicle 101 to pass the target 200 and a maximum available acceleration of the host vehicle 101 as specified by a manufacturer. The ATN can be the ratio of the needed longitudinal acceleration to the maximum longitudinal acceleration of the host vehicle 101. If the needed longitudinal acceleration exceeds a maximum longitudinal acceleration, the computer 105 can set the ATN to 1. The computer 105 may determine the STN, BTN, and/or ATN to produce a respective overall threat number TN for the target 200.

The computer 105 can actuate one or more vehicle components 120 based on the threat number TN, e.g., when the threat number TN is above a predetermined threat number threshold. The computer 105 can actuate one or more components 120 based on a comparison of the threat number to a plurality of thresholds. The thresholds can be determined as, e.g., specifications from a manufacturer, results of simulation testing of virtual host vehicle 101 and virtual target 200 trajectories, empirical testing of vehicle components 120 of the host vehicle 101 during a collision test, etc. For example, if the threat number TN is above 0.7, the computer 105 can actuate a brake 120 to decelerate the host vehicle 101, e.g., at −6.5 meters per second squared (m/s²). In another example, if the threat number TN is above 0.4 but less than or equal to 0.7, the computer 105 can actuate the brake 120 to, e.g., a deceleration of −2.0 m/s². In another example, if the threat number TN is greater than 0.2 but less than or equal to 0.4, the computer 105 can display a visual warning on a host vehicle 101 human-machine interface and/or play an audio warning over a speaker. In yet another example, the computer 105 can actuate a steering motor 120 to steer the host vehicle 101 away from the targets 200 at the lateral acceleration described above. In yet another example, the computer 105 can actuate a propulsion 120 to accelerate the host vehicle 101 through the intersection 205 at the needed acceleration described above.

Figure 3:
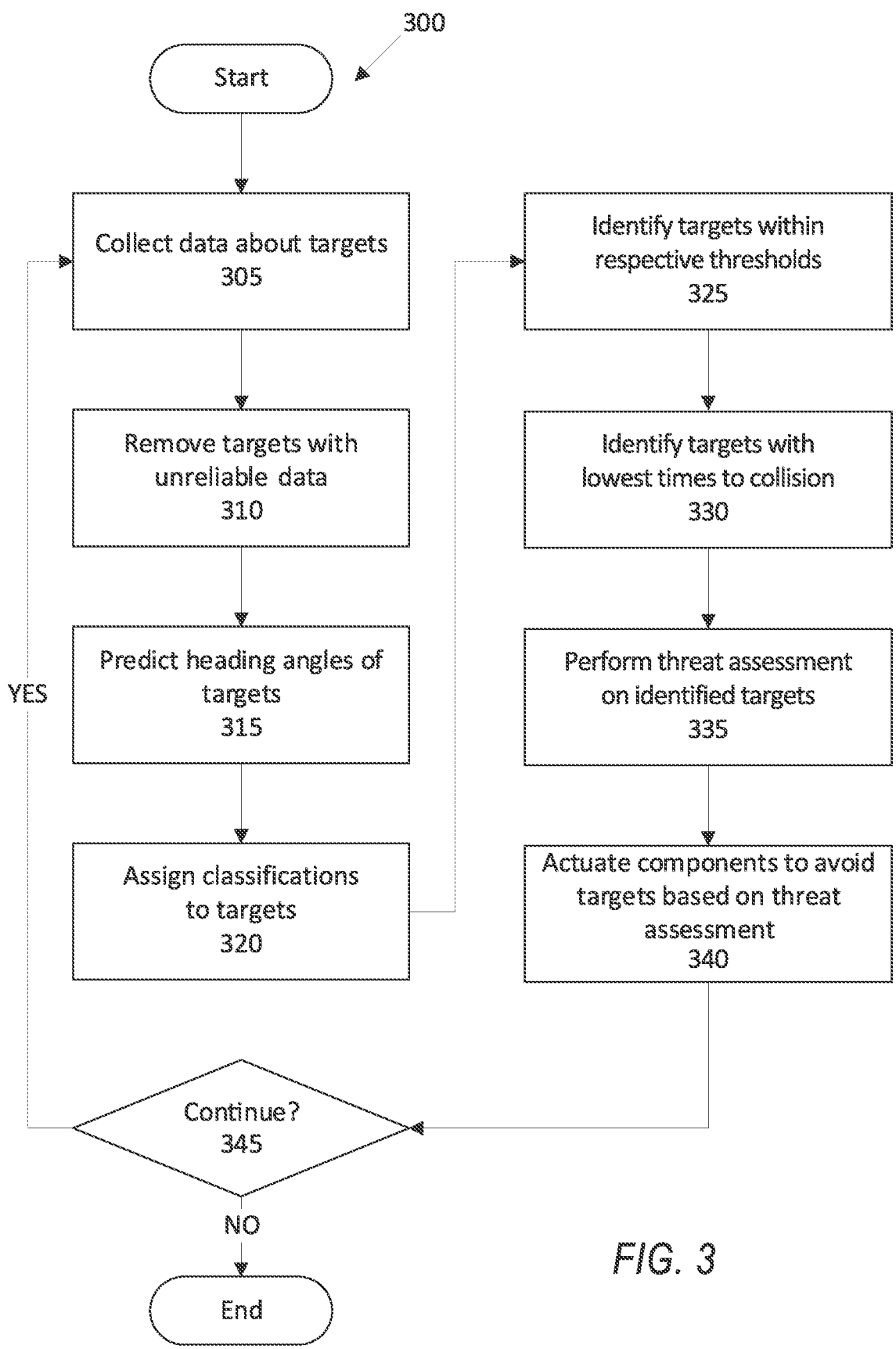
FIG. 3 is a block diagram of an example process for collision mitigation.

FIG. 3 is a block diagram of an example process 300 for collision mitigation. The process 300 begins in a block 305, in which a computer 105 in a host vehicle 101 collects data 115 about a plurality of targets 200. The computer 105 can actuate a plurality of sensors 110 to collect data 115 about the targets 200, as described above.

Next, in a block 310, the computer 105 removes targets 200 from consideration that have unreliable data 115. As described above, the data 115 are "unreliable" when only one sensor 110 detects the target 200 or the data 115 are only collected for a period of time below a time threshold. That is, the computer 105 only considers targets 200 that are able to be detected by more than one sensor 110 for longer than the time threshold.

Next, in a block 315, the computer 105 predicts heading angles θ for each target 200. As described above, the heading angle θ is an angle defined between a trajectory 205 of the target 200 and the longitudinal axis of the host vehicle 101. The computer 105 can determine the heading angle θ based on data 115 collected by the sensors 110 about the targets 200. For example, the computer 105 can apply a conventional image-processing algorithm (e.g., Canny edge detection) to image data 115 to determine the trajectory 205 of the target 200 and the heading angle θ.

Next, in a block 320, the computer 105 assigns each target 200 to a classification based on the heading angle θ. As described above, the target 200 can have a classification of stationary, crossing left, crossing right, oncoming, or same direction. The classification indicates a direction that the target 200 is moving relative to the host vehicle 101.

Next, in a block 325, the computer 105 identifies targets 200 having distances within respective distance thresholds. As described above, the distance thresholds are specific to each classification. For example, the distance threshold for an oncoming target 200 is smaller than the distance threshold for a crossing right target 200.

Next, in a block 330, the computer 105 identifies targets 200 having respective lowest times to collision. As described above, the computer 105 can identify a plurality of targets 200 exceeding a predetermined number on which the computer 105 can perform threat assessment e.g., four. The computer 105 can identify the predetermined number of targets 200 by identifying the predetermined number of targets 200 with the lowest times to collision. For example, if the predetermined number is four, the computer 105 can identify the four targets 200 having the lowest respective times to collision, i.e., the target 200 associated with the four lowest times to collision. By identifying targets with both distances within the distance thresholds and the lowest times to collision, the computer 105 identifies the highest priority targets 200 on which to perform collision mitigation.

Next, in a block 335, the computer 105 performs a threat assessment for each identified target 200. As described above, the threat assessment can be a threat number, e.g., a steering threat number, a brake threat number, etc. The computer 105 can determine the threat number based on, e.g., an estimated deceleration required to stop the host vehicle 101 until the targets 200 pass.

Next, in a block 340, the computer 105 actuates one or more components 120 to avoid the targets 200 based on the threat assessment. For example, the computer 105 can actuate a brake 120 based on a brake threat number to slow or stop the host vehicle 101 until the targets 200 pass the host vehicle 101. In another example, the computer 105 can actuate a steering motor 120 based on a steering threat number to steer the host vehicle 101 away from the targets 200. In another example, the computer 105 can actuate a propulsion 120 based on an acceleration threat number to accelerate the host vehicle 101 past the targets 200.

Next, in a block 345, the computer 105 determines whether to continue the process 300. For example, the computer 105 can determine to continue the process 300 upon reaching another intersection 205 and beginning to perform a turn. If the computer 105 determines to continue, the process 300 returns to the block 305. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   assign each of a plurality of targets to a classification based on respective heading angles of the targets at an initiation of a turn by a host vehicle;
   determine a distance threshold for each target associated with the classification;
   perform a threat assessment on each of the plurality of targets having a respective distance from the host vehicle that is below the distance threshold associated with the respective classification; and
   actuate one or more components of the host vehicle based on the threat assessment.

2. The system of claim 1, wherein the classification is one of stationary, crossing left, crossing right, oncoming, and same direction.

3. The system of claim 1, wherein the instructions further include instructions to perform the threat assessment on each of the plurality of targets having a respective lateral distance that is below a lateral distance threshold and a respective longitudinal distance that is below a longitudinal distance threshold, the lateral distance threshold and the longitudinal distance thresholds being determined based on the classification.

4. The system of claim 1, wherein the instructions further include instructions to assign each of the plurality of targets to a classification based on a yaw rate of the host vehicle at the initiation of the turn by the host vehicle.

5. The system of claim 1, wherein the instructions further include instructions to assign a classification of same direction when a heading angle of one of the targets is within a first threshold of zero degrees, to assign a classification of oncoming when the heading angle of one of the targets is within a second threshold of 180 degrees, to assign a classification of crossing left when the heading angle of one of the targets is within a third threshold of 90 degrees, and to assign a classification of crossing right when the heading angle of one of the targets is within a fourth threshold of 270 degrees.

6. The system of claim 1, wherein the instructions further include instructions to, upon identifying a number of the plurality of targets on which to perform the threat assessment that is below a predetermined number, adjust the respective distance thresholds of one or more of the classifications to identify additional targets on which to perform the threat assessment.

7. The system of claim 6, wherein the instructions further include instructions to, upon identifying a number of the plurality of targets is above the predetermined number, to select the predetermined number of targets having the lowest times to collision.

8. The system of claim 1, wherein the instructions further include instructions to remove a target from consideration for threat assessment when one or more sensors of the host vehicle fail to collect data about the target.

9. The system of claim 1, wherein the instructions further include instructions to determine the respective heading angle of each of the plurality of targets based on a respective lateral velocity and a respective longitudinal velocity of the target.

10. The system of claim 1, wherein the instructions further include instructions to determine the respective distance between each of the plurality of targets and a center point of a front bumper of the host vehicle.

11. The system of claim 1, wherein the instructions further include instructions to identify the initiation of the turn when a yaw rate of the host vehicle exceeds a yaw rate threshold.

12. The system of claim 1, wherein the instructions further include instructions to assign a new classification for one of the targets when a speed of the target exceeds a first threshold or the speed of the target is below a second threshold.

13. The system of claim 1, wherein the instructions further include instructions to assign a new classification for one of the targets based on a current heading angle of the target.

14. The system of claim 1, wherein the threat assessment is a brake threat number, and wherein the instructions further include instructions to actuate a brake to slow the host vehicle according to the brake threat number.

15. The system of claim 1, wherein the threat assessment is an acceleration threat number, and wherein the instructions further include instructions to actuate a propulsion to accelerate the host vehicle according to the acceleration threat number.

16. The system of claim 1, wherein the threat assessment is a steering threat number, and wherein the instructions further include instructions to actuate a steering motor to steer the host vehicle according to the steering threat number.

17. A method, comprising:
assigning each of a plurality of targets to a classification based on respective heading angles of the targets at an initiation of a turn by a host vehicle;
determining a distance threshold for each target associated with the classification; and
performing a threat assessment on each of the plurality of targets having a respective distance from the host vehicle that is below the distance threshold associated with the respective classification; and
actuating one or more components of the host vehicle based on the threat assessment.

18. A system, comprising:
a host vehicle including a steering component;
means for actuating the steering component to perform a turn;
means for assigning each of a plurality of targets to a classification based on respective heading angles of the targets at an initiation of the turn;
means for determining a distance threshold for each target associated with the classification;
means for performing a threat assessment on each of the plurality of targets having a respective distance from the host vehicle that is below the distance threshold associated with the respective classification; and
means for actuating one or more components based on the threat assessment, the one or more components including at least the steering component.

19. The system of claim 18, further comprising means for classifying each of the plurality of targets based on a yaw rate of the host vehicle at the initiation of the turn by the host vehicle.

* * * * *